(12) United States Patent
Baek (10) Patent No.: US 11,009,434 B2
(45) Date of Patent: May 18, 2021

(54) SAMPLE PREP METHOD (71) Applicant: BIOTAGE AB, Uppsala (SE)

(72) Inventor: Sung Baek, Uppsala (SE)

(73) Assignee: BIOTAGE AB, Uppsala (SE)

( * ) Notice: Subject to any disclaimer, the term of this patent is extended or adjusted under 35 U.S.C. 154(b) by 393 days.

(21) Appl. No.: 15/580,698

(22) PCT Filed: Jun. 10, 2016

(86) PCT No.: PCT/EP2016/063322
§ 371 (c)(1),
(2) Date: Dec. 8, 2017

(87) PCT Pub. No.: WO2016/198616
PCT Pub. Date: Dec. 15, 2016

(65) Prior Publication Data
US 2018/0188142 A1 Jul. 5, 2018

(30) Foreign Application Priority Data

Jun. 11, 2015 (EP) .................................... 15171641

(51) Int. Cl.
*G01N 1/40* (2006.01)
*G01N 30/60* (2006.01)
*B01J 20/14* (2006.01)
*B01J 20/32* (2006.01)
*G01N 30/00* (2006.01)

(52) U.S. Cl.
CPC ............ *G01N 1/4055* (2013.01); *B01J 20/14* (2013.01); *B01J 20/3204* (2013.01); *B01J 20/3206* (2013.01); *B01J 20/3287* (2013.01); *G01N 30/6091* (2013.01); *B01J 2220/62* (2013.01); *G01N 2001/4061* (2013.01); *G01N 2030/009* (2013.01)

(58) Field of Classification Search
CPC .................................................... G01N 1/4055
USPC ......................................................... 436/178
See application file for complete search history.

(56) References Cited

U.S. PATENT DOCUMENTS

| 5,658,800 A | 8/1997 | Lessard et al. |
| 2009/0221079 A1 | 9/2009 | Srinivasan et al. |

FOREIGN PATENT DOCUMENTS

| WO | 01/36067 A1 | 5/2001 |
| WO | 2012/109250 A1 | 8/2012 |

OTHER PUBLICATIONS

Kaufmann et al. "Multi-residue quantification of veterinary drugs in milk with a novel extraction and cleanup technique: Salting out supported liquid extraction (SOSLE)" Analytica Chimica Acta 820 (2014) 56-68 (Year: 2014).*

(Continued)

*Primary Examiner* — Lyle Alexander
*Assistant Examiner* — Bryan Kilpatrick
(74) *Attorney, Agent, or Firm* — Nixon & Vanderhye (57) ABSTRACT

Disclosed is a method of supported liquid extraction (SLE), wherein adsorption of at least one analyte to a solid phase is performed in the presence of salt. The method may include contacting a sample with salt, adsorption phase such as diatomaceous earth and optionally a subsequent step of phospholipid depletion. Also disclosed is a cartridge including two compartments, for salt and adsorption phase, and optionally a third compartment including a phospholipid depletion phase.

4 Claims, 5 Drawing Sheets

(56) References Cited

OTHER PUBLICATIONS

Maquille et al. "High-Throughput Screening of Drugs of Abuse in Urine by Supported Liquid-Liquid Extraction and UHPLC Coupled to Tandem MS" Chromatographia 2009, 70, November (No. 9/10) (Year: 2009).*
Liu et al. "Simultaneous determination of polycyclic musks in blood and urineby solid supported liquid-liquid extraction and gaschromatography-tandem mass spectrometry" Journal of Chromatography B, 992 (2015) 96-102 (Year: 2015).*
C Pirard: "Application Note SI-01002 Multi-Residue Confirmation of Pesticides in Honey using Solid Supported Liquid Extraction", Application Note SI-01002, Dec. 31, 2008 (Dec. 31, 2008), pp. 1-2, XP055302308, Retrieved from the Internet <URL:http://www.crawfordscientific.com/downloads/Application-Notes/SI-01002.pdf> [retrieved on Sep. 13, 2016].
Ronald E. Majors: "Supported Liquid Extraction: The Best-Kept Secret in Sample Preparation", LC-GC Chromatography Online, vol. 25, No. 8, Aug. 1, 2012 (Aug. 1, 2012), pp. 430-435, XP055207026, Retrieved from the Internet <URL:http://www.chromatographyonline.com/print/216336?page=full> [retrieved on Aug. 10, 2015].
International Search Report, dated Sep. 23, 2016, from corresponding PCT/EP2016/063322 application.

\* cited by examiner

SAMPLE PREP METHOD

TECHNICAL FIELD

The present invention relates to a method of supported liquid extraction (SLE) and to a cartridge which may be used in the method according to the invention.

BACKGROUND

In the current fast moving development of technologies for the separation of molecules of interest from biological liquids, conventional principles are often used as a starting point to develop enhanced methods suitable for analysis with high requirement of perfection. Water, such as drinking water, has been purified by man for hundreds of years, and water purification remains an important area that constantly requires improvements. Filtering of water can be performed in many ways, one of which as a filtration aid utilizes diatomaceous earth, also known as diatomite, or kieselgur. It is a naturally occurring, soft, siliceous sedimentary rock that is easily crumbled into a fine white to off-white powder with a particle size ranging from less than 3 micrometres to more than 1 millimetre. The typical chemical composition of oven-dried diatomaceous earth is 80 to 90% silica, with 2 to 4% alumina and 0.5 to 2% iron oxide.

More recently, thanks to its unique properties allowing a simple and relatively fast phase separation if used with a water-immiscible solvent, diatomaceous earth has been included into products developed for the preparation of biological samples prior to analysis. As such separation takes place at the aqueous surface of the diatomaceous earth, this separation principle is commonly referred to as supported liquid extraction (SLE), and sometimes solid-supported liquid extraction or solid-liquid extraction.

Thus, SLE is similar to classical liquid-liquid extraction (LLE), but in SLE the aqueous phase is coated onto the diatomaceous earth and instead of shaking the immiscible phases together, the organic phase is usually passed through a column or cartridge holding the diatomaceous earth. SLE is currently regarded as more attractive than LLE for many analytical applications thanks to the greater surface area provided by the support phase and its simplicity in performance. Commercial packed cartridge products are available for SLE, such as ISOLUTE® SLE+ (Biotage), Aquamatrix (Orochem Ontario, Calif.) and Chem Elut (Agilent) marketed for extraction of a diverse range of analytes such as hormones, drugs and drug metabolites from aqueous samples such as biological fluids, including whole blood, plasma, serum, urine and oral fluid.

U.S. Pat. No. 5,658,800 (Phoenix International Life Sciences Inc) relates to an extraction cartridge for extracting a drug from a biological sample with increased specificity using the principle of repetitive thin-film liquid-liquid extraction. More specifically, the extraction cartridge comprises a barrel including a multilayer packing composition, which comprises a buffer layer comprising a buffer material for adjusting the pH of the fluid to be extracted; and a partitioning layer positioned below the buffer layer, which comprises a material for spreading fluid into a thin-film. The multilayer composition may additionally comprise at least one additional layer; e.g. for removing moisture; for removing extraneous materials; or for derivatization of a drug.

SUMMARY OF THE INVENTION

One object of the present invention is to provide an improved method of supported liquid extraction (SLE) for the separation of contaminants from a desired analyte.

A specific object of the invention is to provide such an SLE method, which also removes phospholipids.

Another object of the invention is to provide a novel cartridge for performing SLE.

A specific object of the invention is to provide such a cartridge, which enables a subsequent removal of phospholipids from a biological sample.

These objects and others can be achieved as described in the appended independent claims. Further advantages, details and objects of the invention will appear from the dependent claims as well as from the detailed disclosure that follows.

Definitions

The term "Supported Liquid Extraction" commonly abbreviated "SLE" is used in its conventional meaning in this field and means partitioning between an aqueous layer, immobilized on a solid support and elution by an aqueous-immiscible solvent.

The term "diatomaceous earth", also known as diatomite or kieselgur, can be obtained commercially, such as Celite™ from Sigma Aldrich.

The term "polar solvent" is used herein for an organic solvent chosen based on selectivity of the components present in the sample. The term "polar" is understood to be of a higher polarity than solvents conventionally used for SLE at the date of this patent application.

The term "buffer" or buffer solution" is used herein in its conventional meaning for an aqueous solution consisting of a mixture of a weak acid and its conjugate base, or vice versa. Its pH changes very little when a small or moderate amount of strong acid or base is added to it and thus it is used to prevent changes in the pH of a solution The term "sample preparation" or "sample prep" is a phrase commonly used in the area of science to describe the preparation of a liquid sample to render it in a condition required for selected downstream analysis.

The term "biological" liquid sample means herein that the liquid is of biological origin. Thus, it may be as biological liquid as such, or a diluted, filtered or otherwise processed liquid.

The term "analyte" is used herein to denote any molecule or compound which is the target of an extraction in accordance with the invention. Illustrative examples of analytes includes organic molecules such as biomarkers or medically active molecules, such as drugs or drug metabolites.

BRIEF DESCRIPTION OF THE DRAWINGS

FIG. 5 is to be compared to FIG. 4 (the 100% recovery intensities).

DETAILED DESCRIPTION OF THE INVENTION

A first aspect of the present invention is a method of supported liquid extraction (SLE), wherein adsorption of at least one analyte to a solid phase is performed in the presence of at least one salt. The salt is non-buffering and added to a sample comprising the analyte(s) of interest; or provided as a first step of contact preceding the application of sample to the LSE solid phase. In one embodiment of the method according to the invention, said analyte(s) are eluted by contacting at least one polar solvent with the solid phase.

Thus, dry salt is contacted with or added to a sample comprising analyte(s). In this context, "added" salt is understood to mean something different from commonly used SLE buffers. The addition of salt in accordance to the invention means that that the sample contains more salt than it did originally. A saturated salt solution may be added, and accordingly the actual SLE adsorption step will be performed at a salt concentration close to or above saturation.

As the skilled person will appreciate, any salt will also have at least a small effect on pH. In the present context, the term 'non-buffering' means that the salt added will have a very small or negligible effect on the pH of the biological sample and/or the solid adsorption phase. Differently expressed, the addition of salt in accordance to the invention will not cause any substantial change of pH.

However, as the skilled person will appreciate, depending on the nature of the sample, the analyte and other factors, the present invention does not exclude the addition of a buffer to the biological sample which addition however is not to be confused with the above-discussed "added salt".

As will appear from other parts of the present application, the addition of or contacting with salt in according to the invention is made in order to change the extraction properties. Without wishing to be bound by any theory, it appears that by elevating the salt content of the sample as compared to an untreated sample, the method according to the invention allows using a broader spectrum of solvents, such as more polar solvents, in the subsequent extraction i.e. elution step.

Thus, more specifically, the first aspect of the invention is a method which comprises the steps of
a) providing a biological sample comprising at least one analyte;
b) loading the sample on a solid phase;
c) allowing a period of time for the sample to contact all or substantially all of the solid phase; and
d) passing at least one polar solvent across the solid phase to elute at least one analyte; wherein salt is added in step a) and/or at or before step b).

The sample subjected to supported liquid extraction (SLE) in accordance with the present invention may be any biological sample which comprises at least one analyte of interest, such as a liquid sample or a dried sample dissolved in liquid. The skilled person can easily determine if a certain sample and analyte are suitable for this kind of processing. The sample is biological i.e. of biological origin, such as a human or animal originating sample, and may be originate from a source selected from the group consisting of plants; food stuffs; environmental testing; urine; saliva; whole blood; and blood serum.

The analyte may be any compound or molecule suitable for SLE, such as a biomarker, e.g. of a certain disease, medical condition or abuse; or a medically active compound or molecule, such as a drug or a drug candidate. Specific examples of biomarkers include hormones, vitamins and steroids. Thus, the present invention may constitute a part of a diagnostic procedure, such as a sample prep step preceding spectrometric analysis, such as MS or tandem MS.

The solid phase may be any commonly used SLE phase, such as diatomaceous earth. In this context, unless otherwise stated, the term 'diatomaceous earth' includes any modifications thereof, such as improved SLE materials based on diatomaceous earth, provided its advantageous properties for use in SLE are not changed to any substantial extent. In one specific embodiment, the diatomaceous earth is obtained directly from nature and used without any substantial modifications.

As the skilled person will appreciate the diatomaceous earth and/or polymeric solid support may be combined with conventional solid phase materials. An example of a commercially available solid phase is ISOLUTE™ SLE+(Biotage).

As indicated above, the addition of salt in according to the invention is made in order to change the extraction properties. Thus, more polar organic solvents that have a high level of solubility and or are completely miscible in water may partition from it through the use of saturation of an aqueous layer i.e. adsorption buffer or liquid with salts. For example, although acetonitrile is miscible with water, it can become immiscible when the aqueous layer becomes saturated with salts. In light of these characteristics, organic polar analytes that are polar can partition into acetonitrile when the aqueous layer becomes saturated with salts; where organic polar analytes may not partition into less polar solvents such as those used in traditional SLE.

Thus, in one embodiment, said at least one polar solvent is selected from the group consisting of acetonitrile; isopropyl alcohol, ethyl acetate, methyl tert-butyl ether, toluene, petroleum ether, acetone, dimethyl formate, dimethoxysulphate, dichlormethane, hexanes, heptanes, pentanes, tetrahydrofuran, ethyl alcohol, methanol, butyl alcohols; or a mixture of two or more thereof. As the skilled person will appreciate, the combination of polar organic solvents may be reduced in its polarity through the addition of a less polar organic solvent to provide a reduction of endogenous interferences; or the combination of a polar organic solvent with a more polar organic solvent may provide a higher polarity level to improve recoveries. Any combination of polar solvents should be able to provide a partition between a salt saturated biological sample and a solid phase, and preferably to minimize the combined elution of endogenous interferences.

As will be discussed in relation to the second aspect of the invention, a separate salt layer is preferably arranged upstream of the solid adsorption phase, to provide a passage for the sample before reaching the solid phase. Thus, dry salt is provided which the sample will soak before it proceeds towards the adsorption phase. However, the salt may be added in any other way: In a specific embodiment, the salt is added by addition of a non-buffering salt solution, preferably saturated with respect to salt, to the biological sample before loading onto the solid phase. Alternatively, or additionally, the solid phase is soaked with a non-buffering salt solution before loading of the biological sample.

The salt may be any salt that provides the desired effect described herein without having a negative impact on the analyte(s) present in the sample. Thus, the salt may be selected from sodium chloride, potassium chloride, zinc chloride, zinc sulphate, sodium/potassium phosphate (mono basic or di basic or combinations of these), sodium bicarbonate, sodium carbonate, sodium hydroxide, potassium hydroxide, sodium acetate, sodium formate, ammonium sulphate, HCl salts, sulphonic acid salts, nitric acid salts, phosphoric acid salts, ion pairing agents such as dibutyl ammonium acetate, trifluoroacetic acid salts. In an advantageous embodiment, the salt is sodium chloride.

As is well known, procedures such as SLE may under certain circumstances release other components from the sample than the desired analyte. For example, certain pH ranges may for some biological sample release e.g. fatty materials, for example phospholipids, often denoted 'endogenous phospholipids' if released from the sample of interest. As is well known, phospholipids may be undesired in an extract as they may disturb subsequent steps of analysis of molecules such as biomarkers, such as a subsequent GC-MS/FID/Head Space/Electrochemical, LC-MS/UV/FL/Electrochemical/conductivity/RI, tandem MS or LC-MS/MS.

Thus, in one embodiment, the method according to the invention also comprises a step of removing additional components such as proteins, peptides and/or phospholipids from the eluent or extract resulting from step d). This may be achieved by using a separation matrix specifically designed to remove such components, utilizing separation principles such as ion exchange, hydrophobic interactions and/or mixed mode interactions.

In an advantageous embodiment, the method according to the invention includes a step subsequent or simultaneous to the SLE, wherein phospholipids are separated from the analyte(s) using an additional solid phase, which has different separation properties as compared to the above described diatomaceous earth. Examples of commercially available products capable of removing phospholipids are ISOLUTE™ PLD+(Biotage), Hybrid SPE (Sulpelco/Sigma Aldrich), Ostro (Waters), PHREE (Phenomenex), Captiva ND Lipids plate (Agilent), HyperSep (Thermo). This kind of solid phases are sometimes denoted 'phospholipid scavenging phases'.

Thus, in one embodiment the second solid phase for phospholipid depletion is arranged downstreams of i.e. subsequent to the SLE solid phase. In an alternative embodiment, the two phases are mixed and hence contacts the biological sample during the same step.

Consequently, a specific embodiment is a method which comprises the steps of
a) providing a biological sample comprising at least one analyte;
b) contacting the sample with salt;
c) passing the sample on to a solid phase;
d) allowing a period of time for the sample to contact all or substantially all of the solid phase;
e) passing at least one polar solvent across the solid phase to elute at least one analyte;
f) loading the eluent originating from step e) on a further solid phase for phospholipid depletion; and
f) recovering the analyte(s) from the eluent from the phospholipid depletion solid phase.

In an advantageous embodiment, the equipment is arranged to directly pass the liquid exiting the SLE solid phase on to the phospholipid depletion solid phase. Suitable measures and conditions for adsorption and elution of analyte(s) using conventional phospholipid depletion solid phases are well known to the skilled person in this field.

In terms of equipment, the method according to the invention is advantageously performed as conventional SLE, i.e. in an elongated container or barrel, such as a column, a cartridge or the wells of a plate, which allows the sample to be dispersed throughout by gravity, as well as the passing of the organic phase at a controlled flow rate either through gravity or using vacuum and/or positive pressure.

Thus, a second aspect of the invention is a cartridge for supported liquid extraction (SLE), which includes at least two separate compartments, one of which comprises a solid adsorption phase and one of which comprises at least one salt. In this context, "separate" means that the compartments are sufficiently separated to allow for the sample to first pass one compartment and then pass the other. As the skilled person will understand, such separate compartments may be obtained by providing different layers separated by a suitable partitioning such as fits or filters. In this context, the term 'cartridge' should be interpreted in its broadest sense and includes any elongated format of container suitable for performing SLE, as discussed above.

In one embodiment of the cartridge according to the invention, an opening i.e. inlet for feeding a liquid into the cartridge is provided, which opening is in fluid communication with and directly connected to the salt compartment. In this context, "directly" means that no other compartment including sold phase or other media is arranged in between, in order for the sample to become saturated or at least mixed with salt before being loaded on the SLE solid phase. However, as the skilled person will appreciate, there may be a filter/frit or a separate plate with salts, a partitioning wall or even interior tubing provided, depending on how the cartridge is designed.

In one embodiment, the cartridge contains an outlet for removing liquid which is arranged in fluid communication with the solid adsorption phase compartment.

As the skilled person will understand, the inlet will be used first to add the liquid sample, and optionally saturated salt solution, and in a subsequent step to add the organic phase applied to extract analyte(s) from the aqueous phase. The outlet will be used to release extracted polar solvent comprising one or more analyte(s) of interest.

In a specific embodiment, the cartridge according to the invention includes an additional compartment comprising an additional solid phase capable of capturing, retaining or binding other non-analyte endogenous sample components such as proteins, peptides and/or phospholipids. The material may be in ion exchange media, a hydrophobic interaction media and/or a mixed mode media, or any mixture or combination thereof. As mentioned above, one advantageously used product for the removal or depletion of phospholipids is ISOLUTE™ PLD+(Biotage).

In one embodiment, the additional compartment is located between the solid adsorption phase compartment and the outlet, i.e. downstream of the SLE in terms of processing order. In one embodiment, the cartridge comprises filters or frits at the inlet and/or outlet end(s), and optionally also to separate the compartments comprising salt; SLE solid phase; and phospholipid depletion solid phase. As the skilled person will understand, other conventionally used elements such as valves and tubing may also be integral parts of the cartridge according to the invention.

In an advantageous embodiment, the second aspect of the invention is a multicompartment cartridge or plate column, which has an upper compartment holding ISOLUTE™ SLE+(Biotage) and a lower compartment holding ISOLUTE™ PLD+(Biotage). In one embodiment, a salt compartment including e.g. saturated sodium chloride liquid is arranged above i.e. upstream to the SLE solid phase in terms of processing order. This embodiment is advantageously used to process aqueous biological samples such as hormones, drugs or drug metabolites in blood, serum or urine as a step preceding subsequent analysis by GC-MS/FID/Head Space/Electrochemical, LC-MS/UV/FL/Electrochemical/conductivity/RI, tandem MS or LC-MS/MS.

In summary, it is to be understood that all details regarding the first aspect of the invention may be applied to the second aspect as discussed above.

DETAILED DESCRIPTION OF THE DRAWINGS

Figure 1:
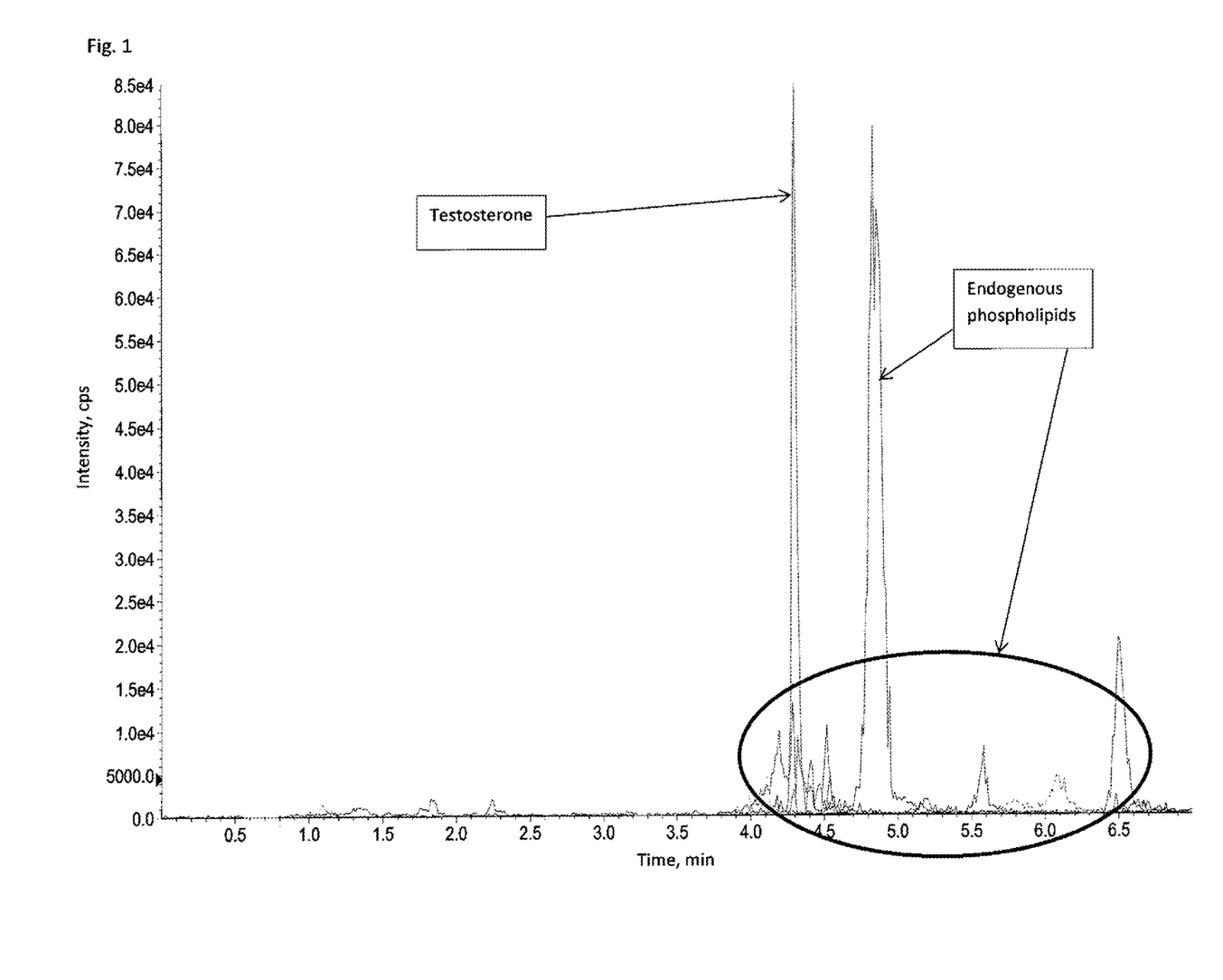
FIG. 1 shows a protein precipitation extraction (PPT) of testosterone from serum described in Example 1.

FIG. 1 shows the protein precipitation extraction (PPT) of Testoterone from serum according to Example 3. More specifically, it shows how testosterone, peak at 4.25 minutes co-elutes with the ion suppressing/enhancing endogenous phospholipids peaks ranging between approximately 4 minutes to 6.5 minutes. Phospholipids are known to offset quantitation values, which results in inaccurate and imprecise quantitative results.

Figure 2:
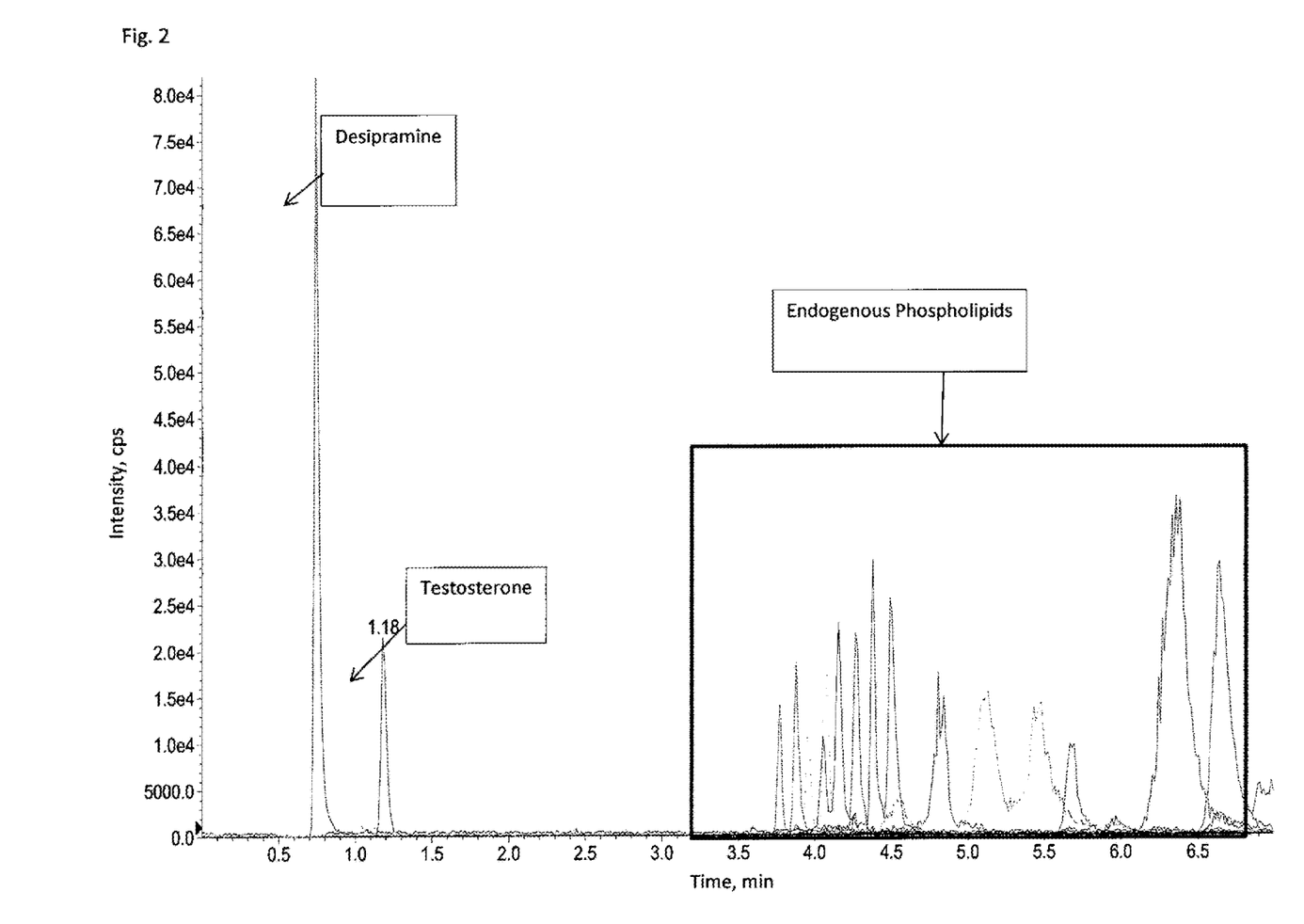
FIG. 2 shows an extraction using conventional SLE+ from a serum matrix and the effects of using a polar organic solvent, acetonitrile, and the resulting phospholipids

FIG. 2 shows a representable chromatogram of despramine with retention time at 0.7 minutes and testosterone with retention time at 1.18 minutes after a conventional SLE+ extraction using a polar elution solvent, acetonitrile. More specifically, it shows how acetonitrile elutes analytes desipramine (first peak at 0.7 minutes) and testosterone (second peak at 1.18 minutes), but also elutes endogenous interferences of phospholipids (peaks appearing in the range of 3.5 minutes to 6.5 minutes).

Figure 3:
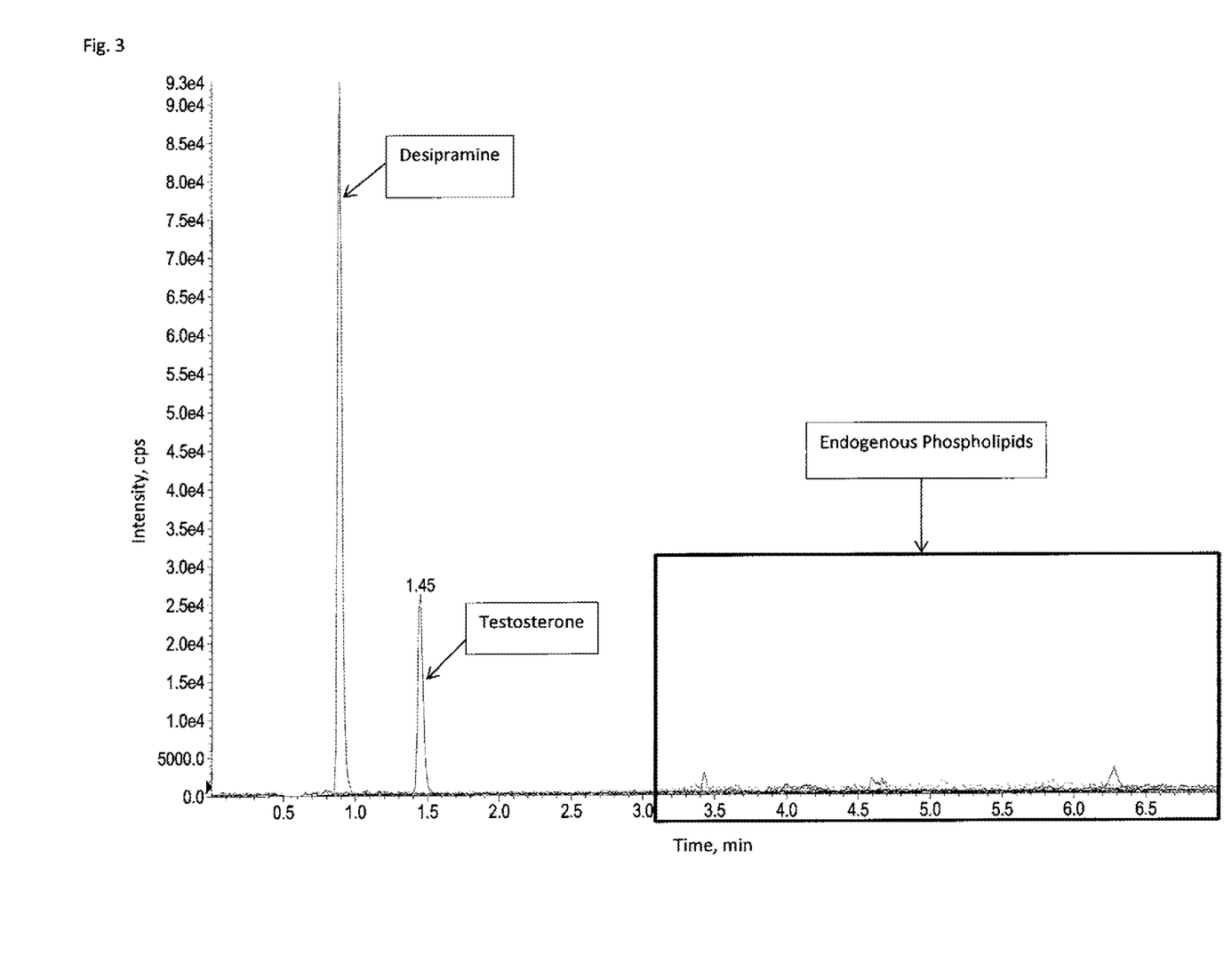
FIG. 3 shows the removal of endogenous phospholipids when using the invention; 3-layered column (salt-SLE+ material-PLD+ material). The same methodology to produce FIG. 2 was used to compare.

FIG. 3 shows a comparable chromatogram of an extraction according to the invention using a 3-layered column (salt-SLE+ material-PLD+ material). It demonstrates the effective removal of endogenous phospholipids from a serum matrix, while affording similar recoveries relative to the conventional SLE+ (FIG. 2).

Figure 4:
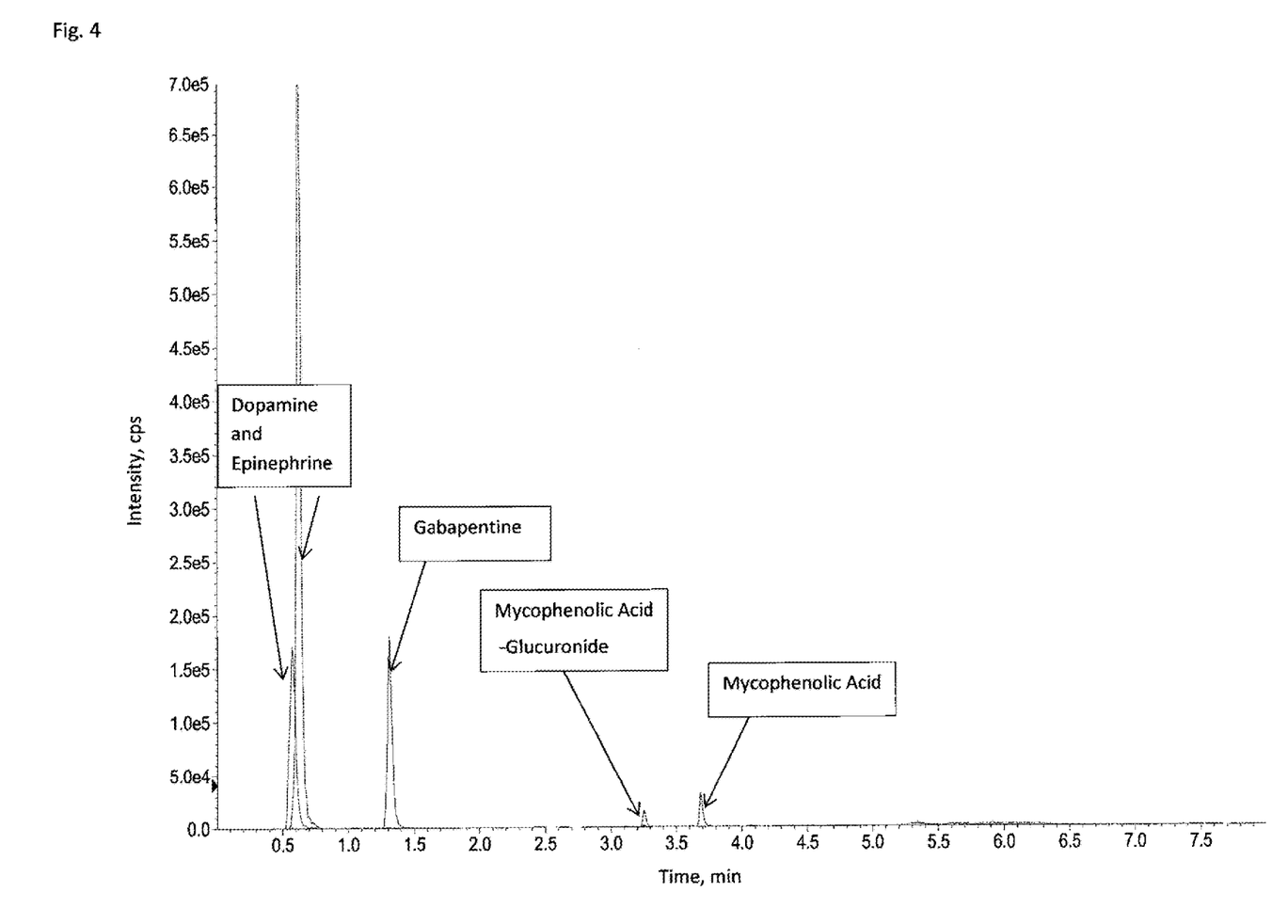
FIG. 4 shows a representable chromatogram of spiked standards at 200 ng/mL into blank solution; increasingly polar analytes from right to left.

FIG. 4 shows a representable chromatogram of a 200 ng/mL spiked blank without extraction and without matrix. The height intensities of the peaks represent 100% total recoveries. Epinephrine height intensity=1.6e5, Dopamine height=7e5, Gabapentine height intensity=1.7e5, Mycophenolic Acid-Glucuronide height intensity=1.5e4, Mycophenolic Acid height intensity=3e4

Figure 5:
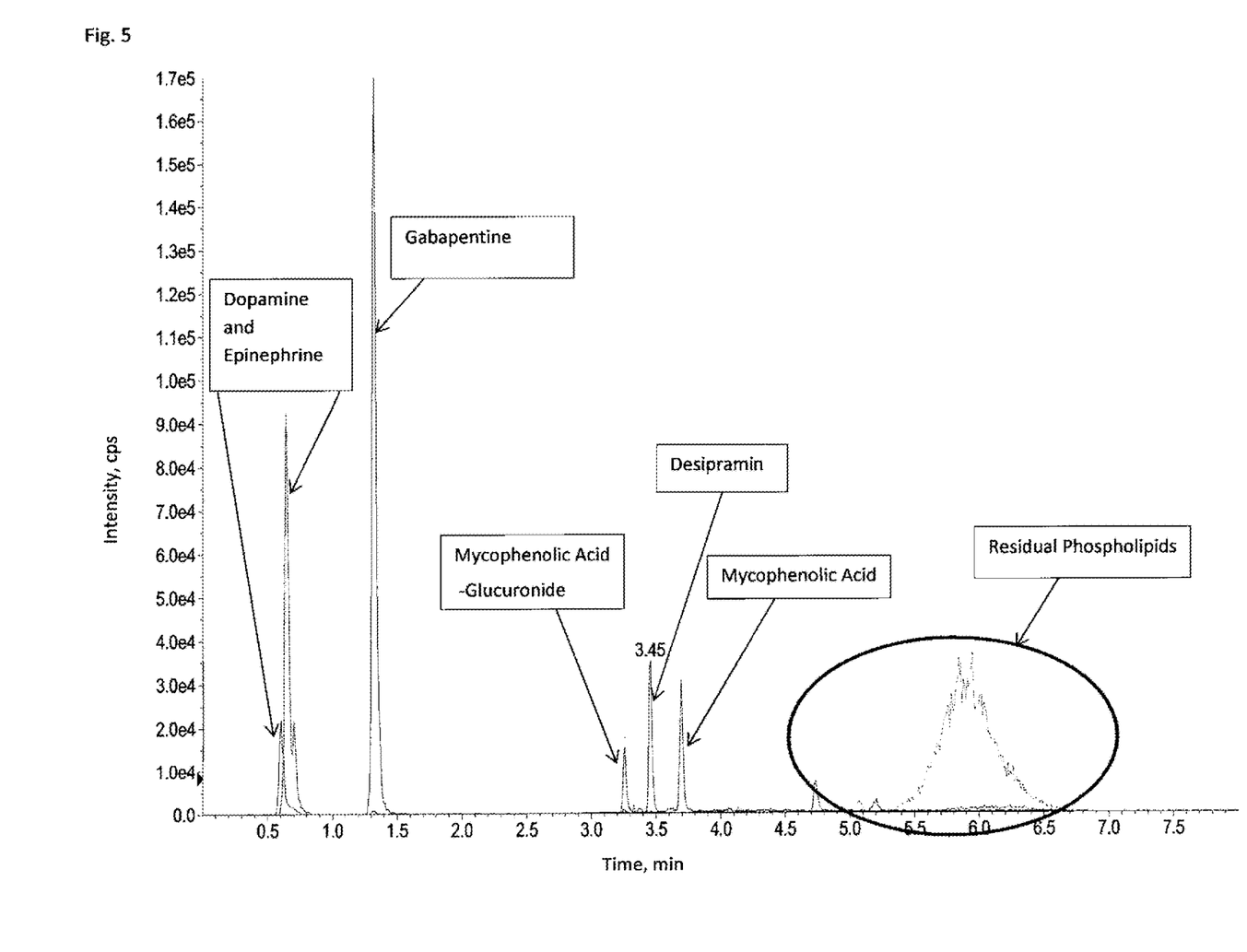
FIG. 5 shows a representable chromatogram of an extraction from serum at 200 ng/mL using the invention; three layered column (salt-SLE+-PLD+) and polar organic solvent, acetonitrile as the elution solvent.

FIG. 5 shows a representable chromatogram of a 200 ng/mL spiked serum extracted using the invention. The height intensities of the peaks represent what was lost during either the extration or ion suppression caused by endogenous interferences that might have co-eluted with the analytes. Epinephrine height intensity=2e4, Dopamine height intesity=8.2e4, Gabapentine height intensity=1.7e5, Mycophenolic Acid-Glucuronide height intensity=1.5e4, Mycophenolic Acid height intensity=3e4. Since the chromatograms are reverse phase and therefore peaks generally elute from most polars early and non-polars later; it is evident that yields are quantitative starting with analytes that are as polar as Gabapentine and later. The chromatogram also shows a significant reduction in phospholipids when compared to PPT extraction (FIG. 1) or the prior art of conventional SLE+ when extracting with a polar organic solvent such as acetonitrile (FIG. 2)

EXPERIMENTAL PART

The present examples are presented for illustrative purposes only, and should not be construed as limiting the invention as defined by the appended claims.

Example 1

This example shows the extraction of the analytes despramine and/or testoterone from serum using the PPT (FIG. 1) and conventional SLE+ (FIG. 2), but with the effects of eluting with acetonitrile. These experiments compares how endogenous phospholipids are completely extracted with the analytes in both PPT and conventional SLE+ (when using acetonitrile for elution) and hence demonstrate the invention's capacity to effectively remove endogenous phospholipids that are present in the first two extractions (FIGS. 1 and 2)

Experimental Extraction Procedure:

PPT:
1. Using a 1 mL pipettor along with a 1 mL pipette tip, add 1 mL of 2% Formic acid into a 2 mL eppindorf tube
2. Create a working standard mix concentration of testosterone and despiramine at 1000 ng/mL, such that 50 uL of which would be considered the "spiked serum"
3. Spike in 250 uL of spiked serum (created from step 2) and vortex for 30 seconds
4. Centrifuge at 2k rpm's and remove majority of supernatant into a 13×100 mm culture tube
5. Dry down with a gentle stream of nitrogen gas at 37° C. until completely free of solvents visually with the use of a TurboVap LV
6. Add 200 uL of 50:50 methanol:water to recon
7. Gently shake for 2 minutes
8. Inject unto an Agilent 1200 LC with AB Sciex 4000 Qtrap with the appropriate methodology Conventional SLE+ (Using Acetonitrile as the Elution Solvent):
1. Create a 1000 ng/mL working standard of testosterone and despriamine, such that 50 uL of the working standard into 200 uL of serum would create a 200 ng/mL "spiked serum"
2. Premix into an eppindorf tube 250 uL of 200 ng/mL spiked serum with 100 uL of saturated sodium chloride in water (brine solution) and vortex for 10 seconds.
3. Load the entire premix from step 2 unto a 400 uL, 3 mL SLE+ cartridge (Biotage Part #820-0055-BG). If contents does not penetrate frit, apply 20 psi of positive pressure for 1 second.
4. Wait 5 minutes for the sample to diffuse through the SLE+ sorbent bed
5. Elute with 3×1 mL's of acetonitrile under gravity
6. Collect the extract into a 13×100 mm culture tube
7. Dry down using a gentle stream of nitrogen at 37° C. with the use of a TurboVap LV until the tube is completely free of solvents visually.
8. Add 200 uL of 50:50 methanol:water to reconstitute the sample into solution
9. Gently shake for 2 minutes
10. Inject unto an Agilent 1200 LC with AB Sciex 4000 Qtrap with the appropriate methodology.

Procedure Used to Compare Biotage Isolute SLE+ (Biotage Part #=820-0055-BG) to the Present Invention
1. First pre-mix 200 uL of serum (Golden West Biologics part #MSG-1000) with 50 uL of 200 ng/mL standards of Epinephrine, Dopamine HCl, Gabapentine, Mycophenolic Acid-Glucuronide, Desipramine, Mycophenolic Acid and Testoterone. Standards were prepared by dissolving into Acetonitrile at 200 ng/mL concentrations for the analytes for a total volume of 250 uL.
2. Load premixed sample from step 1) unto Invention bed and allow to absorb through the hydrophobic frit via gravity. The acetonitrile content in the premix allows the matrix to pass through a hydrophobic frit
3. Once premixed serum has passed through the frit, allow 10 minutes for the serum to become saturated with NaCl from the top layer of the bed 4. Then elute analytes: Epinephrine, Dopamine, Gabapentine, Mycophenolic Acid-Glucuronide, Desipramine, Mycophenolic Acid and Testosterone using 3×1 mL aliquotes of a 2% Formic Acid in acetonitrile solution. Each 1 mL aliquote is allowed to flow under gravity before subsequent aliquotes were added, and a positive pressure of Nitrogen gas from a Positive Pressure manifold (Biotage Part #=PPM-48) is applied on top of the cartridge to help elute the acidified acetonitrile layer passing through the cartridge. Also a flow rate of 1 drip per second was controlled. Due to the saturation of the aqueous serum matrix, acetonitrile is now immiscible with the saturated serum, while gaining the benefits of its polority to pull out lower log P valued compounds from the more polar matrix layer.
5. Approximately 2.7 mL's of eluant was recovered in a 13×100 mm culture tube and subsequently dried down to dryness. The dried extract should not contain a pink or red tint and barely visible to the human eye, residue should remain.
6. 200 uL's of 30% Methanol in H2O was used to reconstitute the residue and vortexed to ensure sample has been dissolved into the solvent.
7. 5 uL was injected unto an Agilent 1260 series LC with a AB Sciex 4000 Qtrap Example 2

This is a comparative example between Conventional SLE+ vs the invention of the 3-layered column, while both extraction strategies use acetonitrile for elution.

Both procedures following the same protocol depicts in the conventional SLE+ when using a polar solvent, acetonitrile, results in endogenous phospholipids eluting with analytes (FIG. 2). However, when the invention is applied to the same procedure and the use of acetonitrile, it results in significant removal of endogenous phospholipids (FIG. 3). Also noted was a pink tint to the acetonitrile elution through the conventional SLE+, where as the Invention 3-layered column was clear and colorless even after drydown.

Experimental Extraction Procedure:
Conventional SLE+ and the Invention of the 3-Layered Column (Using Acetonitrile as the Elution Solvent for Both Procedures):
1. Create a 1000 ng/mL working standard of testosterone and despriamine, such that 50 uL of the working standard into 200 uL of serum would create a 200 ng/mL "spiked serum"
2. Premix into an eppindorf tube 250 uL of 200 ng/mL spiked serum with 100 uL of saturated sodium chloride in water (brine solution) and vortex for 10 seconds.
3. Load the entire premix from step 2 unto a 400 uL, 3 mL SLE+ cartridge (Biotage Part #820-0055-BG). If contents does not penetrate frit, apply 20 psi of positive pressure for 1 second.
4. Wait 5 minutes for the sample to diffuse through the SLE+ sorbent bed
5. Elute with 3×1 mL's of acetonitrile under gravity
6. Collect the extract into a 13×100 mm culture tube
7. Dry down using a gentle stream of nitrogen at 37° C. with the use of a TurboVap LV until the tube is completely free of solvents visually.
8. Add 200 uL of 50:50 methanol:water to reconstitute the sample into solution
9. Gently shake for 2 minutes
10. Inject unto an Agilent 1200 LC with AB Sciex 4000 Qtrap with the appropriate methodology.

Procedure Used to Compare Biotage Isolute SLE+ (Biotage Part #=820-0055-BG) to the Present Invention Example 3

This is a comparison of recoveries and endogenous phospholipids for an array of polar analytes during the extraction of Epinephrine, Dopamine, Gabapentine, Mycophenolic Acid-Glucuronide, Desipramine, Mycophenolic Acid from serum using Invention vs No extraction/no matrix Comparative example of two extractions (FIGS. 4 and 5): FIG. 4 represents 100% recovery since no extraction and no matrix was incorporated. FIG. 5 is to show how a gradient of polar analytes are effected by an extraction from matrix using Invention. This indicates that acetonitriles polarity has the capacity to elute polar analyte Gabapentine at approximately 100% recovery (based on height intensities), however more polar analyte Epinephrine or Dopamine results in lower recoveries (based on height intensities.

Experimental Extraction Procedure:
Conventional SLE+ and the Invention of the 3-Layered Column (Using Acetonitrile as the Elution Solvent for Both Procedures):
1. Create a 1000 ng/mL working standard of testosterone and despriamine, such that 50 uL of the working standard into 200 uL of serum would create a 200 ng/mL "spiked serum"
2. Premix into an eppindorf tube 250 uL of 200 ng/mL spiked serum with 100 uL of saturated sodium chloride in water (brine solution) and vortex for 10 seconds.
3. Load the entire premix from step 2 unto a 400 uL, 3 mL SLE+ cartridge (Biotage Part #820-0055-BG). If contents does not penetrate frit, apply 20 psi of positive pressure for 1 second.
4. Wait 5 minutes for the sample to diffuse through the SLE+ sorbent bed
5. Elute with 3×1 mL's of acetonitrile under gravity
6. Collect the extract into a 13×100 mm culture tube
7. Dry down using a gentle stream of nitrogen at 37° C. with the use of a TurboVap LV until the tube is completely free of solvents visually.
8. Add 200 uL of 50:50 methanol:water to reconstitute the sample into solution
9. Gently shake for 2 minutes
10. Inject unto an Agilent 1200 LC with AB Sciex 4000 Qtrap with the appropriate methodology.

Procedure Used to Compare Biotage Isolute SLE+ (Biotage Part #=820-0055-BG) to the Present Invention
Agilent 1200 LC with AB Sciex 4000 Qtrap Methodology:
Retention times and MRM transitions of analytes of polar analyte suite from FIGS. 4 and 5:
0.6 min=Epinephrine [184.1>166.1]
0.7 min=Dopamine [154.3>137.3]
1.4 min=Gabapentine [172>154]
3.3 min=Mycophenolic Acid-Glucuronide [514.2>207.1]
3.5 min=Desipramine [267.2>72]
3.7 min=Mycophenolic Acid [321>207.1]
Agilent LC Pump Method Properties:

| Pump Model: | Agilent 1260 Binary Pump |
|---|---|
| Minimum Pressure (psi): | 0.0 |
| Maximum Pressure (psi): | 8702.0 |
| Dead Volume (μl): | 40.0 |
| Maximum Flow Ramp (ml/min$^2$): | 100.0 |
| Maximum Pressure Ramp (psi/sec): | 290.0 |
| Max Flow Ramp Up (ml/min$^2$): | 100.0 |

-continued

| | | | | |
|---|---|---|---|---|
| Max Flow Ramp Dn (ml/min$^2$): | | 100.0 | | |
| Step Table: | | | | |
| Step | Total Time(min) | Flow Rate(µl/min) | A (%) | B (%) |
| 0 | 0.00 | 400 | 40.0 | 60.0 |
| 1 | 1.00 | 400 | 0.0 | 100.0 |
| 2 | 4.00 | 400 | 0.0 | 100.0 |
| 3 | 4.01 | 400 | 40.0 | 60.0 |
| 4 | 8.00 | 400 | 40.0 | 60.0 |
| Left Compressibility: | | 50.0 | | |
| Right Compressibility: | | 115.0 | | |
| Left Dead Volume (µl): | | 40.0 | | |
| Right Dead Volume (µl): | | 40.0 | | |
| Left Stroke Volume (µl): | | −1.0 | | |
| Right Stroke Volume (µl): | | −1.0 | | |
| Left Solvent: | | A2 | | |
| Right Solvent: | | B2 | | |

Materials and Method: Procedure for Packing the Biotage Enhanced ISOLUTE® SLE+ cartridge (available from Biotage):
Materials Required for Packing Invention:
1. Phase Separator from Biotage (Biotage part #1201903-BG)
2. PLD+ Sorbent (Biotage part #918-0050-P01). PLD+ sorbent is removed from a 96 well plate using a pin to push out from the bottom outlet. Several wells of PLD+ sorbent was removed to accommodate a mass load of 100 mg of PLD+ sorbent for Invention cartridge
3. SLE+ Sorbent (Biotage part #820-0055-B). SLE+ sorbent was removed from a 3 mL cartridge barel from the part number indicated. 550 mg per cartridge was collected for Invention
4. Hydrophobic fits (Biotage part #120-1033-B). These hydrophobic fits were obtained directly from Biotage and used as is.
5. 8 mm outer diameter wooden doll rod was acquired from a local hard ware store and used as is.

Procedure for Packing the Invention
1. On top of the hydrophobic frit inside the phase separator, 100 mg of ISOLUTE® PLD+ sorbent extracted from Biotage part #918-0050-P01 is carefully loaded with an even and level bed and a hydrophobic frit is compressed on top and lightly tampered down with a doll rod.
2. 550 mg of the Biotage Isolute SLE+ sorbent (material acquired from the Biotage part #820-0055-B) is then loaded on top of the leveled frit above the Isolute PLD+ bed and again is even and leveled. A hydrophobic frit is again pushed on top of the SLE+ bed and tampered down using a doll rod
3. Finally, 250 mg of NaCl is loaded on top of the SLE+ bed and again, evened and leveled using a hydrophobic frit on top and compressed with a doll rod.

All three layers should consume the volume of approximately 60% of a 3 mL cartridge; allowing enough space above to load at least 1 mL volume aliquotes of solvent on top without overfill.

Standards Obtained for Spiking Solutions:
Epinephrine (Sigma Aldrich part #E4642)
Dopamine HCl (Cerilliant part #D-081)
Gabapentine (Sigma Aldrich part #1287303-250 MG)
Mycophenolic Acid-Glucuronide (Cerilliant part #M-135)
Desipramine HCl (Cerilliant part #D-906)
Mycophenolic Acid (Cerilliant part #M-106)
Testosterone (Sigma Aldrich part #T-037)
Eluant:
Acetonitrile (Fisher Optima part #A955-4)
Formic Acid (Fisher Optima LC-MS grade part #A117-50)

The invention claimed is:

1. A method of supported liquid extraction (SLE), comprising:
   a) providing a biological sample comprising at least one analyte;
   b) loading the sample on a solid phase;
   c) allowing a period of time for the sample to contact all or substantially all of the solid phase;
   d) passing at least one polar solvent across the solid phase to elute at least one analyte; and
   e) removing phospholipids from the eluent resulting from step d);
      wherein sodium chloride is added in step a) and/or before or at step b).

2. A method according to claim 1, wherein the at least one analyte is an aqueous sample selected from the group consisting of urine; saliva; whole blood; and blood serum.

3. A method according to claim 1, wherein the solid phase comprises diatomaceous earth.

4. A method according to claim 1, wherein the at least one polar solvent is selected from the group consisting of acetonitrile, isopropyl alcohol, ethyl acetate, methyl tert-butyl ether, toluene, petroleum ether, acetone, dimethyl formate, dimethoxysulphate, dichlormethane, hexanes, heptanes, pentanes, tetrahydrofuran, ethyl alcohol, methanol and butyl alcohols, and mixtures of two or more thereof.

* * * * *